(12) United States Patent
Alhazza

(10) Patent No.: US 11,441,305 B1
(45) Date of Patent: Sep. 13, 2022

(54) DEVICE FOR PREVENTING DRAIN BLOCKAGE

(71) Applicant: GIFTEDNESS AND CREATIVITY COMPANY, Safat (KW)

(72) Inventor: Hebah Abdullah Alhazza, Safat (KW)

(73) Assignee: GIFTEDNESS AND CREATIVITY COMPANY, Safat (KW)

( * ) Notice: Subject to any disclaimer, the term of this patent is extended or adjusted under 35 U.S.C. 154(b) by 0 days.

(21) Appl. No.: 17/574,487

(22) Filed: Jan. 12, 2022

(51) Int. Cl.
| | |
|---|---|
| *E03F 5/14* | (2006.01) |
| *B08B 1/00* | (2006.01) |
| *B01D 29/64* | (2006.01) |
| *B01D 35/02* | (2006.01) |
| *B08B 1/04* | (2006.01) |
| *E04D 13/04* | (2006.01) |

(52) U.S. Cl.
CPC ............ *E03F 5/14* (2013.01); *B01D 29/6476* (2013.01); *B01D 35/02* (2013.01); *B08B 1/005* (2013.01); *B08B 1/04* (2013.01); *E04D 2013/0413* (2013.01)

(58) Field of Classification Search
CPC ....... E03F 5/14; B01D 29/6476; B01D 35/02; B08B 1/005; B08B 1/04; E04D 2013/0413; E03C 1/26; E03C 1/264
See application file for complete search history.

(56) References Cited

U.S. PATENT DOCUMENTS

| | | | |
|---|---|---|---|
| 969,364 A | 9/1910 | Grootenhuis | |
| 1,903,366 A * | 4/1933 | Mercier | E03C 1/264 |
| | | | 4/292 |
| 2,672,983 A * | 3/1954 | Blau | E04D 13/0409 |
| | | | 210/354 |
| 3,341,020 A | 9/1967 | Sivadon | |
| 5,820,762 A * | 10/1998 | Barner | E03F 5/0404 |
| | | | 210/255 |
| D460,810 S | 7/2002 | Sommerhein | |
| 7,718,055 B2 | 5/2010 | Tou | |

FOREIGN PATENT DOCUMENTS

| | | |
|---|---|---|
| CN | 202298810 U | 7/2012 |
| CN | 106759802 A | 5/2017 |

OTHER PUBLICATIONS

Turner, "The No-Flood Storm Drain," Yanko Design website, Nov. 3, 2014: https://www.yankodesign.com/2014/11/03/the-no-flood-storm-drain/.

* cited by examiner

*Primary Examiner* — Liam Royce
(74) *Attorney, Agent, or Firm* — Nath, Goldberg & Meyer; Richard C. Litman

(57) ABSTRACT

A device for preventing drain blockage can include a planar base and an upright vane support rotatably supported on the base. The vane support includes a plurality of curved vanes mounted in a radial configuration thereon. The base includes a plurality of raised portions on an upper surface thereof and a cylindrical flange extending downwardly from a bottom surface thereof. The flange can frictionally engage the inner walls of a drain pipe for draining water from the device. A base insert is housed within a circular recess of the base and rotatably supports the vane support. The vanes each include a lower edge in close proximity to the top surface of the base. When wind, rain, or debris strikes the curved vanes, the vane support rotates, and the lower edges of the vanes sweep away any debris accumulating on the base.

14 Claims, 5 Drawing Sheets

DEVICE FOR PREVENTING DRAIN BLOCKAGE

BACKGROUND

1. Field

The disclosure of the present patent application relates to drains and, particularly, to a device for preventing drain hole blockage.

2. Description of the Related Art

Outdoor drains are particularly vulnerable to blockage. While some outdoor drains are large enough to accept debris or can be easily cleaned, roof drains and balcony drains often get clogged by debris, causing considerable damage. Thus, a device for preventing drain blockage solving the aforementioned problems is desired.

SUMMARY

A device for preventing drain blockage can include a planar base and an upright vane support rotatably supported on the base. The vane support includes a plurality of curved vanes mounted in a radial configuration thereon. The base includes a plurality of raised portions on an upper surface thereof and a cylindrical flange extending downwardly from a bottom surface thereof. The flange can frictionally engage the inner walls of a drain pipe for draining water from the device. A base insert is housed within a circular recess of the base and rotatably supports the vane support. The vanes each include a lower edge in close proximity to the top surface of the base. When wind, rain, or debris strikes the curved vanes, the vane support rotates, and the lower edges of the vanes sweep away any debris accumulating on the base.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
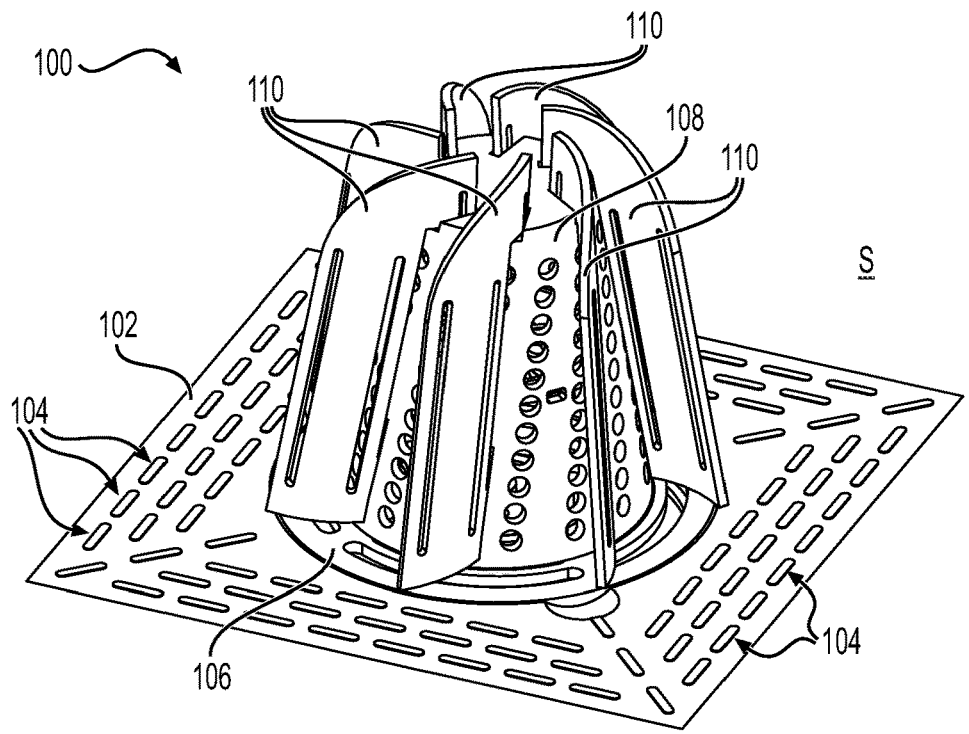
FIG. 1 is an environmental perspective view of a device for preventing drain blockage mounted on a surface over a drain.
Figure 2:
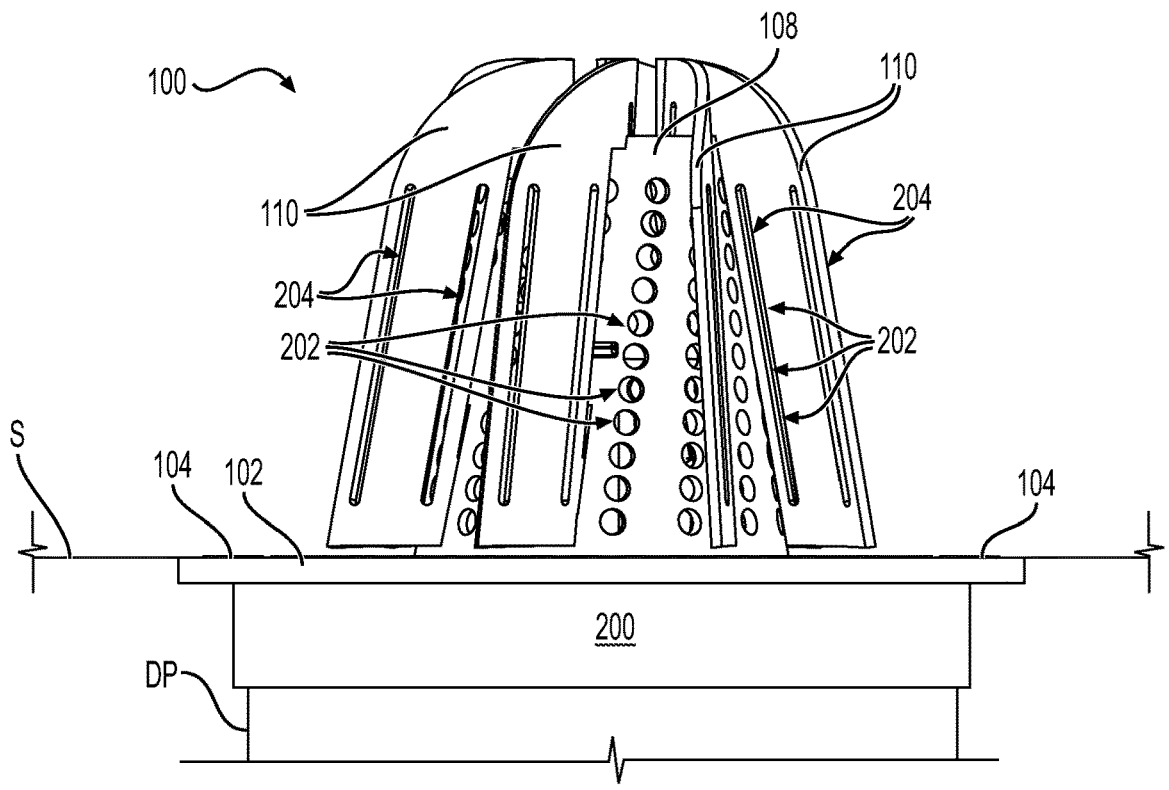
FIG. 2 is a side view of the device for preventing drain blockage of FIG. 1.

In FIGS. 1 and 2, the device for preventing drain blockage 100 is shown mounted on a surface S requiring drainage. The device 100 includes a planar base 102 including a plurality of raised portions 104 on an upper surface thereof and a cylindrical flange 200 depending from a bottom surface thereof. The flange 200 is configured to fit within a drain pipe DP and, thereby, connect the base 102 to the drain pipe DP. A base insert 106 is housed within a circular recess of the base 102 and rotatably supports an upright vane support 108. The vane support 108 can be frustoconical. The vane support 108 has a plurality of curved vanes 110 mounted in a radial configuration thereon and a plurality of through holes 202 defined therethrough. Each vane 110 extends substantially along a length of the vane support 108 such that a lower edge thereof is only slightly spaced from a top surface of the base 102. In an embodiment, the space between the lower edge of each vane 110 and the top surface of the base 102 is about 5 cm or less. The vanes 110 each include two or more slots 204. When wind, rain, or debris strikes the vanes 110, the vane support 108 rotates, similar to a turbine-type roof vent, and the lower edges of the vanes 110 sweep any debris outwardly and away from the raised portions 104 of the base 102.

Figure 3:
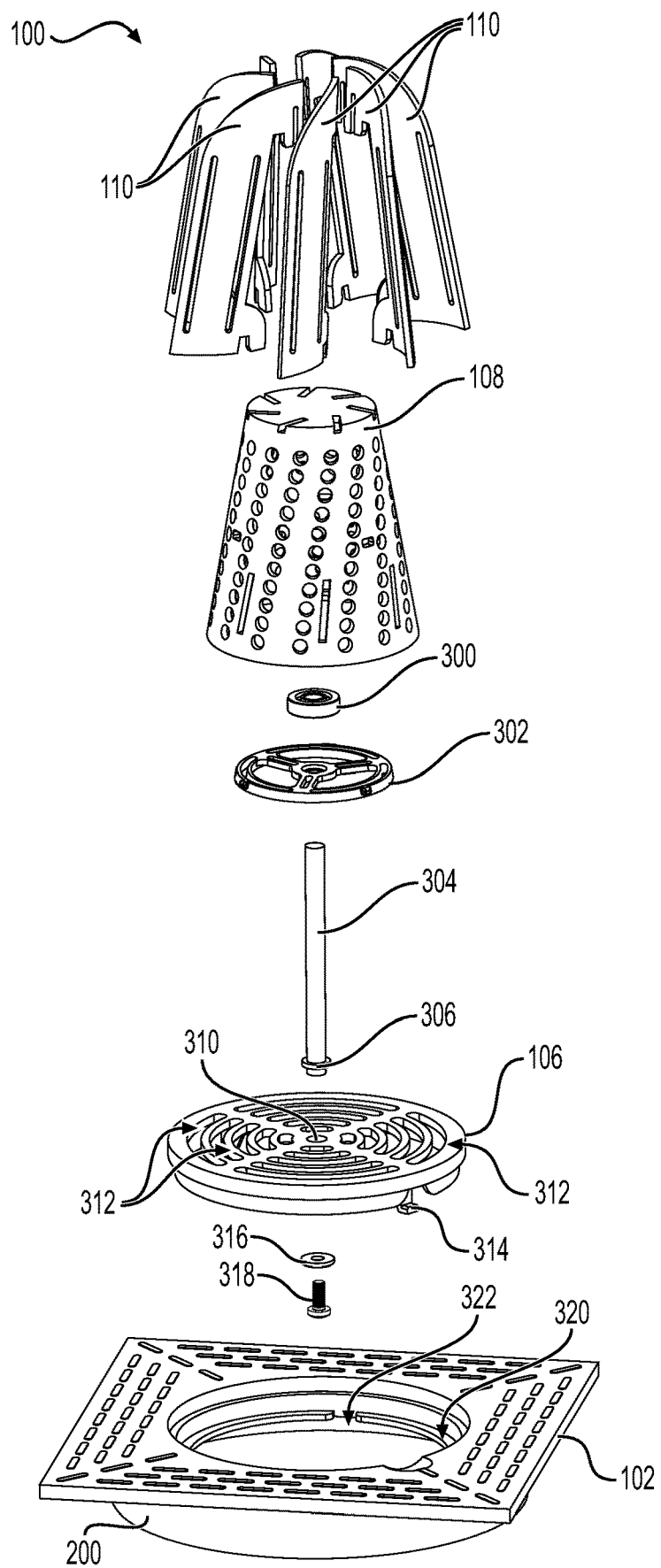
FIG. 3 is an exploded, perspective side view of the device for preventing drain blockage of FIG. 1.
Figure 4:
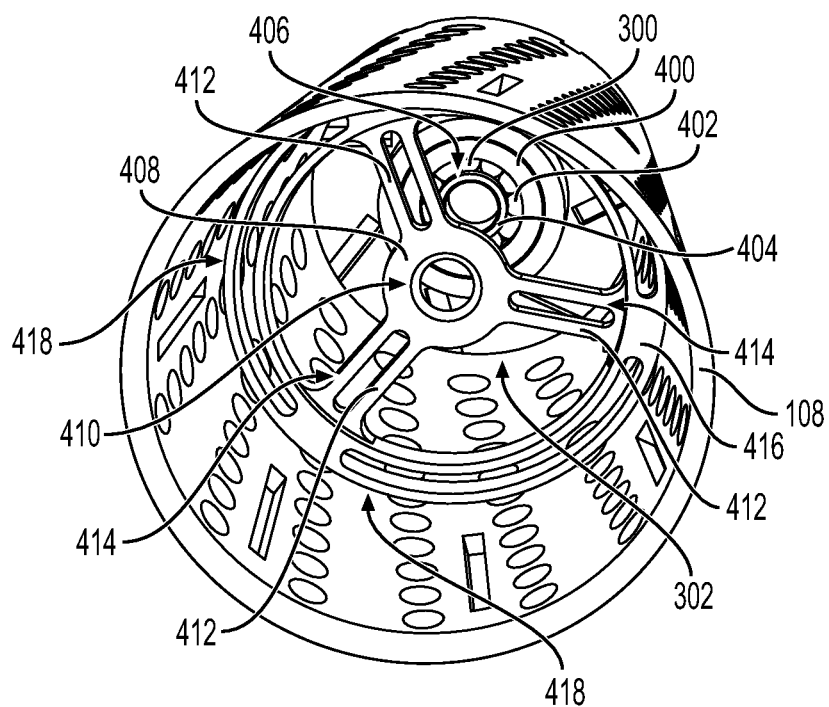
FIG. 4 is a bottom perspective view of a vane support assembly of the device for preventing drain blockage, showing the internal components thereof.
Figure 5:
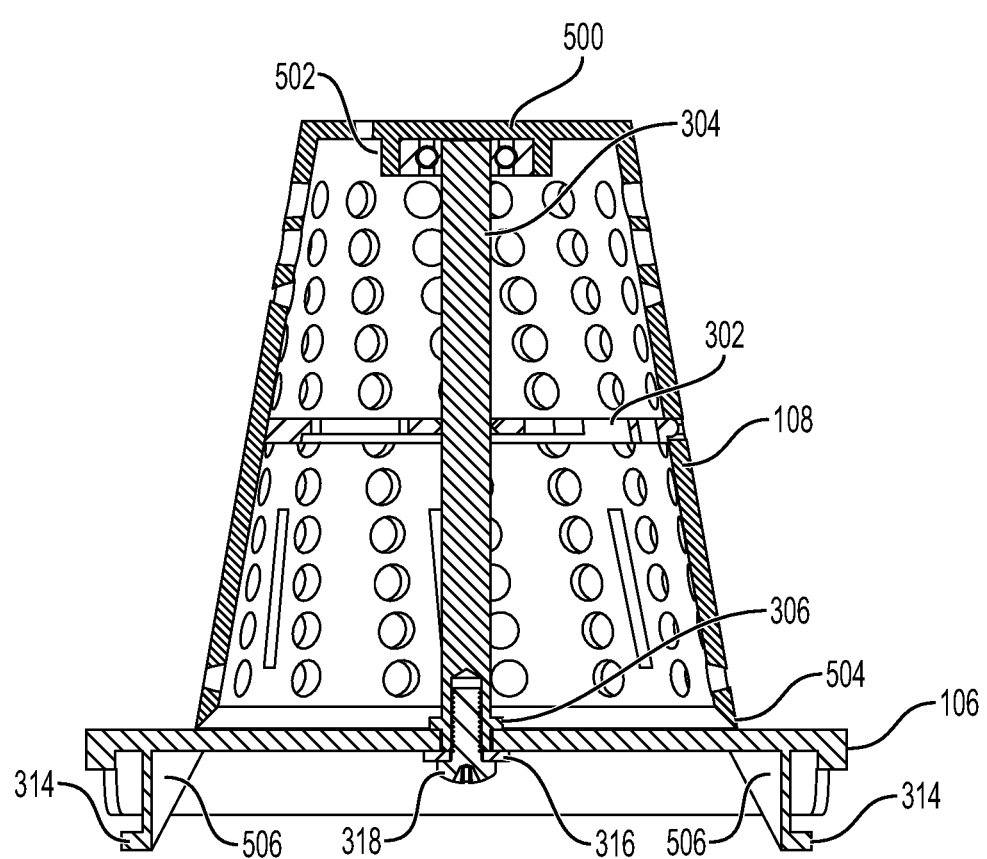
FIG. 5 is a side cross sectional view through the center of the vane support assembly of FIG. 4, showing the additional components for rotatably mounting the vane support assembly on a base insert of the device for preventing drain blockage.

Details of the frustoconical vane support 108 are shown in FIGS. 3-5. A ball bearing assembly 300 is mounted within a ball bearing housing 502 extending down from a planar top wall 500 of the vane support 108. The ball bearing assembly 300 includes an outer race 400, an inner race 404 having a central hole 406, and a plurality of ball bearings 402 between the outer race 400 and the inner race 404, as is known with conventional ball bearing assemblies. A centering bracket 302 abuts the inner surface of the sidewall of the vane support 108. The centering bracket 302 includes an inner ring 408 with a central hole 410 therethrough. Three radially extending ribs 412 are attached to, and integral with, the inner ring 408 and extend outwardly to an outer ring 416. The radially extending ribs 412 are equally spaced and extend at about 120° from one another. Each radially extending rib 412 includes a radially extending slot 414 extending from the inner ring 408 to the outer ring 416. The outer ring 416 abuts the inner surface of the sidewall and includes three circumferentially extending slots 418, each circumferentially extending slot 418 extending from one of the radially extending ribs 412 to an adjacent rib 412. A vertical support rod 304 extends through the central hole 410 of the inner ring 408 of the centering bracket 302, with a top end thereof being housed within the central hole 406 of the inner race 404 of the ball bearing assembly 300. A bottom end of the vertical support rod 304 is housed within a central hole 310 in the base insert 106 and includes a radial flange 306. The bottom end of the vertical support rod 304 includes a central threaded bore. A screw 318 extends through a washer 316 and into the central threaded bore of the vertical support rod 304 to attach the rod 304 to the base insert 106.

Figure 6:
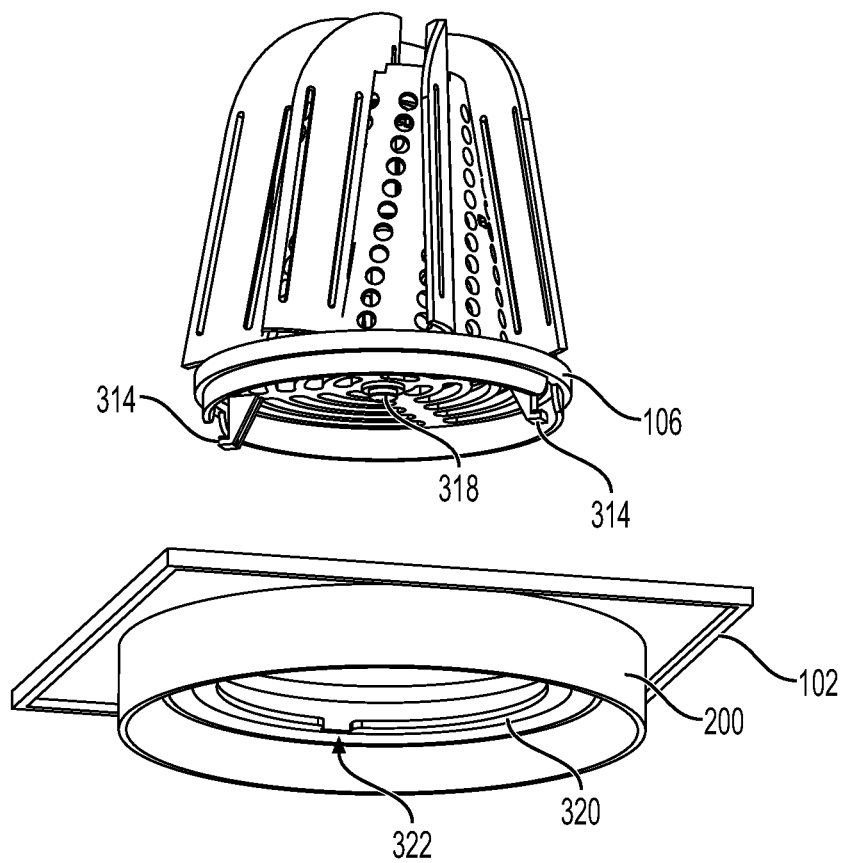
FIG. 6 is a bottom perspective view of the device for preventing drain blockage.
Figure 7:
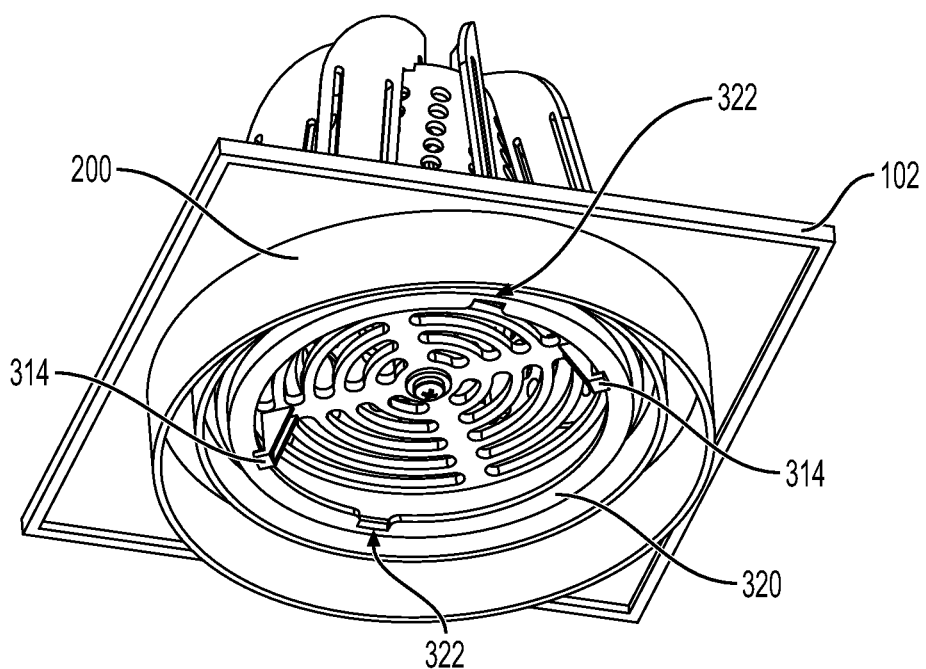
FIG. 7 is a bottom perspective view of the device for preventing drain blockage of FIG. 1, showing the base insert locked to the base.

Further details of the base 102, the base insert 106 and the connection therebetween are shown in FIGS. 3 and 5-7. The base insert 106 includes a plurality of circumferentially extending slots 312 arranged in increasing diameter. The slots 312 allow water to drain through the base insert 106 and into the drain pipe DP below. Two radially extending tabs 314 are mounted opposite one another (180° apart) on the bottom outer edge of the base insert 106. Each tab 314 is reinforced by a triangular reinforcement rib 506 extending from the bottom surface of the base insert 106 to the inner surface of the tabs 314. The base 102 further includes an inwardly extending circular flange 320 on the inner surface of the flange 200. The flange 320 includes two openings 322 configured to receive the tabs 314 of the base insert 106. FIG. 6 shows the upper components of the device for preventing drain blockage 100 attached to the base insert 106 using screw 318, with the base insert 106 disconnected from the base 102. The components can be assembled together by first aligning the tabs 314 with the openings 322 and then lowering the base insert 106 (and upper assembly) until the tabs 314 pass through the openings 322 and are below the level of the flange 320. The base insert 106 is then rotated until the tabs 314 are no longer aligned with the openings 322 as is shown in FIG. 7, thereby locking the base insert 106 into the central opening of the base 102. To remove the base insert 106, the base insert can be rotated until the tabs 314 align with the openings 322 and then the base insert 106 can be lifted out of the central opening of the base 102.

Figure 8:
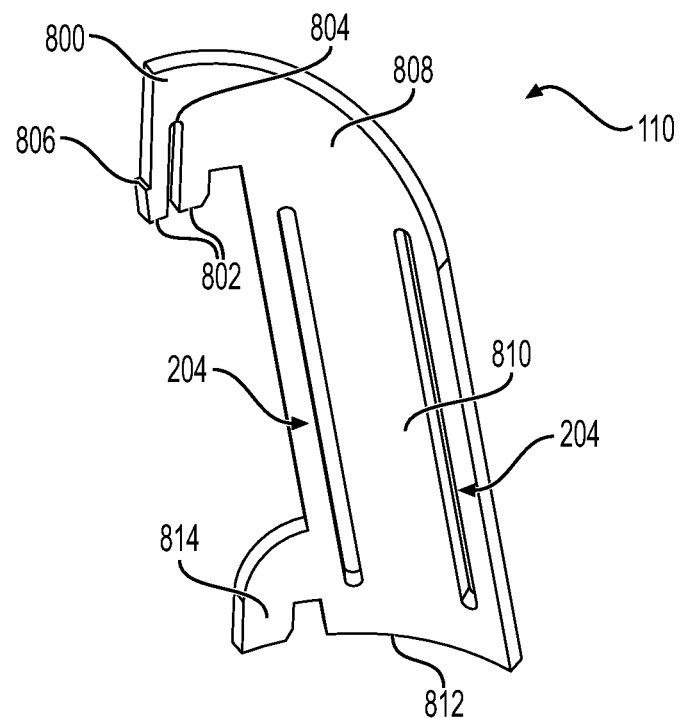
FIG. 8 is a side perspective view of a vane of the device for preventing drain blockage of FIG. 1.
Figure 9:
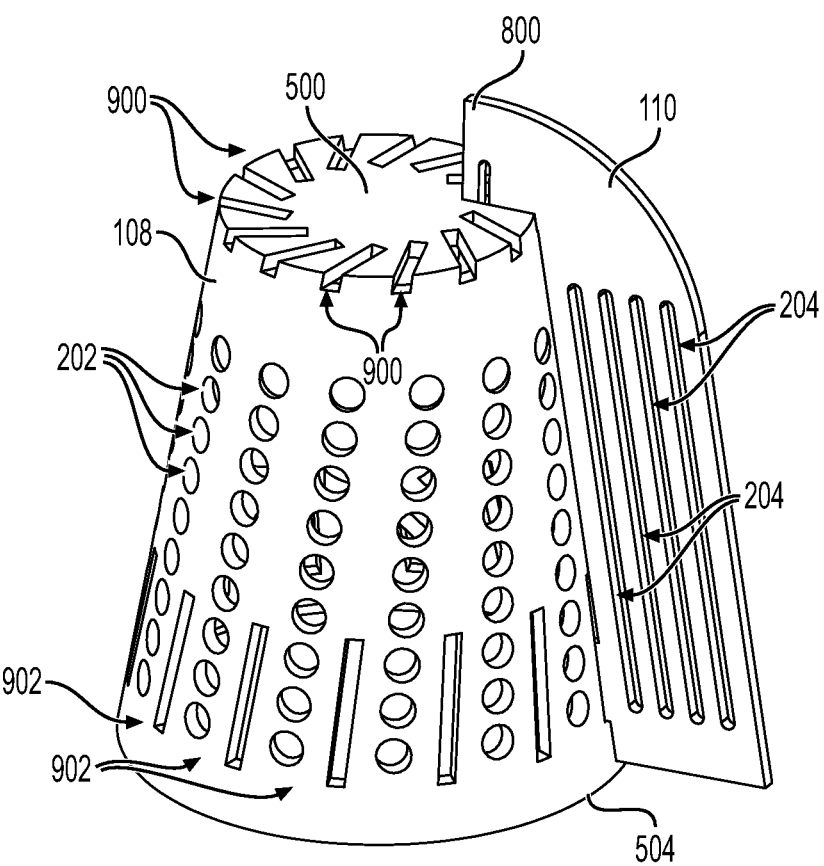
FIG. 9 is a side perspective view of the vane support assembly, showing a single vane snapped into place on the vane support assembly.

Further details of the vanes 110, the frustoconical vane support 108, and the connections therebetween are shown in FIGS. 8-9. FIG. 8 shows the details of a single vane 110. The top of the vane 110 includes an upper tab 800 extending inwardly from the main body of the vane 110. The upper tab 800 includes two tines 802 with a slot 804 separating the tines 802. The outer tine 802 includes a raised catch 806 with a flat top surface. The main body of the vane 110 includes a curved top 808, a curved center 810 and a curved bottom 812, such that when all the vanes 110 are assembled on the frustoconical vane support 108 (as shown in FIGS. 1, 2, 6 and 7) they form a turbine similar to a turbine-type roof vent. Each vane 110 includes several vertical slots 204 (two shown in FIGS. 1-3 and 6-8, four shown in FIG. 9), extending from the curved top 808 to the curved bottom 812. Each vane 110 also includes a lower tab 814 with a single tine. The frustoconical vane support 108 includes upper vane slots 900 along a periphery of top wall 500 and lower vane slots 902 along a lower edge 504 of the peripheral wall of the vane support 108. To install each vane 110 onto the vane support 108, the upper tab 800 is inserted into the upper vane slots 900 and the lower tab 814 is inserted into the lower vane slots 902.

It is to be understood that the device for preventing drain blockage is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A device for preventing drain blockage, comprising:
   a planar base including a top surface, a bottom surface, and a cylindrical flange extending downwardly from the bottom surface, the flange having an inner surface;
   an upright vane support rotatably supported on the base, the vane support including a planar top wall and a sidewall; and
   a plurality of curved vanes mounted in a radial configuration on the vane support, each of the plurality of vanes having a lower edge, wherein
   rotation of the vane support causes lower edges of the vanes to sweep away debris collected on the base;
   a circular recess defined within the base; and
   a circular base insert housed within the recess.

2. The device for preventing drain blockage as recited in claim 1, wherein the circular base insert comprises a plurality of circumferentially extending slots defined therethrough.

3. The device for preventing drain blockage as recited in claim 1, further comprising:
   a vertical support rod having a top end and a bottom end, the bottom end of the vertical support rod being housed within a central hole of the base insert.

4. The device for preventing drain blockage as recited in claim 3, further comprising:
   a bearing housing depending from the bottom surface of the planar top wall of the vane support, the bearing assembly having a central hole; and
   a bearing assembly mounted within the bearing housing, a top end of the vertical support rod being housed within the central hole of the bearing assembly.

5. The device for preventing drain blockage as recited in claim 4, wherein:
   the bearing assembly is a ball bearing assembly having an inner race, an outer race, and a plurality of ball bearings therebetween.

6. The device for preventing drain blockage as recited in claim 4, further comprising a centering bracket, the centering bracket including:
   an inner ring with a central hole therethrough;
   an outer ring surrounding the inner ring; and
   a plurality of radially extending ribs extending between the inner ring and the outer ring, wherein the vertical support rod extends through the central hole of the inner ring.

7. The device for preventing drain blockage as recited in claim 6, wherein the plurality of radially extending ribs comprises three radially extending ribs equally spaced and extending 120 degrees from one another.

8. The device for preventing drain blockage as recited in claim 4, wherein:
   the bottom end of the vertical support rod further includes a central threaded bore and a screw extending into the central threaded bore.

9. The device for preventing drain blockage as recited in claim 1, wherein:
   the base insert includes two radially extending tabs mounted opposite one another along an outer edge thereof; and
   the base includes an inwardly extending flange on the inner surface of the downwardly extending flange, the inwardly extending flange having two openings positioned opposite one another for receiving the radially extending tabs of the base insert.

10. The device for preventing drain blockage as recited in claim 1, wherein:
    each of the plurality of curved vanes further includes:
       an upper tab extending inwardly from a top surface of a main body of the vane; and
       a lower tab extending inwardly from a bottom surface of the main body of the vane; and the vane support includes:
       a plurality of upper vane slots along a periphery of the top wall of the vane support; and
       a plurality of lower vane slots along a lower edge of the sidewall of the vane support, wherein
       the upper tabs of the plurality of the vanes extend into the upper vane slots; and
       the lower tabs of the plurality of vanes extend into the lower vane slots.

11. The device for preventing drain blockage as recited in claim 10, wherein:
- the upper tab includes an inner tine, an outer tine and a slot separating the tines, the outer tine having a raised catch with a flat top surface; and
- the flat top surface of the raised catch engages the bottom surface of the planar top wall.

12. The device for preventing drain blockage as recited in claim 1, wherein the vane support includes a plurality of through holes extending through the sidewall.

13. The device for preventing drain blockage as recited in claim 1, wherein each vane includes a plurality of vertical slots extending therethrough.

14. The device for preventing drain blockage as recited in claim 1, further comprising a plurality of raised portions on the base.

\* \* \* \* \*